W. GALLOWAY.
Manufacture of Earthenware and Pottery.

No. 162,911                                    Patented May 4, 1875.

Witnesses, Harry Smith
Thomas McIlvain

Wm Galloway
by his attys.
Howson and Son.

THE GRAPHIC CO. PHOTO-LITH. 39 & 41 PARK PLACE, N.Y.

UNITED STATES PATENT OFFICE.

WILLIAM GALLOWAY, OF PHILADELPHIA, PENNSYLVANIA.

IMPROVEMENT IN THE MANUFACTURE OF EARTHENWARE AND POTTERY.

Specification forming part of Letters Patent No. 162,911, dated May 4, 1875; application filed March 13, 1874.

*To all whom it may concern:*

Figure 1:
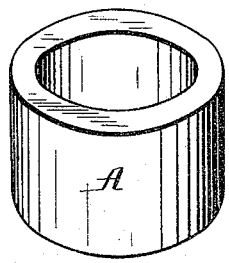
Figure 2:
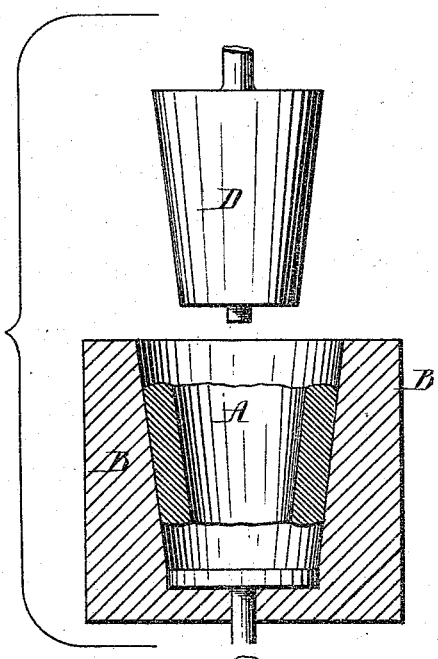

Be it known that I, WILLIAM GALLOWAY, of Philadelphia, Pennsylvania, have invented an Improvement in the Manufacture of Earthenware and Pottery, of which the following is a specification:

The object of my invention is to facilitate the manufacture of earthenware and pottery by first reducing the clay to a tubular shape, as shown in Fig. 1 of the accompanying drawing, then adjusting the tube into the mold B, and then subjecting it to the action of a follower, D, under pressure, the first branch of the process enabling me to complete the second more effectually, and to readily remove the product from the mold.

The ordinary plan of manufacturing earthenware articles—such, for instance, as flower-pots—is by manipulating clay on a potter's wheel, an operation which demands the aid of a workman of skill and experience. Attempts, however, have been made with varying success to make earthenware articles by subjecting them to the action of dies or molds of a shape conforming with that of the object to be produced, the difficulty attending this process being the adhesion of the clay to the dies or molds, even when the latter have been well oiled—a difficulty which I obviate in a manner which I will now more fully describe.

Figure 3:
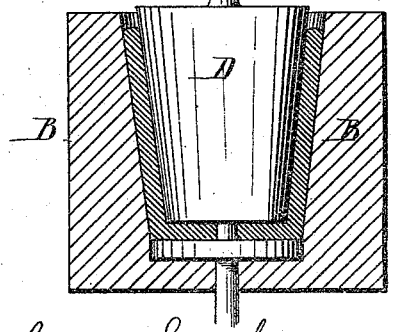

In carrying out the preparatory process I use the well-known machine for making clay pipes in which the clay is forced through an annular opening. I have found that this operation reduces the clay to the best condition for the subsequent operation, and imparts to it a surface which prevents adhesion to the molds. I cut from the pipe a piece, A, of proper bulk for conversion into the desired object, which in the present instance is an ordinary flower-pot, and this piece I adjust to the mold B, spreading out the cylinder so as to conform to the interior of the mold, after which the follower D, forming a part of a suitable press, is forced downward, so as to disperse the clay and reduce it to the desired shape, as shown in Fig. 3, when it may be removed from the mold preparatory to being placed in the kiln, this removal being accomplished without difficulty, owing to the condition to which the clay has been reduced and to the surface imparted to it by the preliminary operation. The short tubular pieces of clay must be exposed to the air for a few hours before being subjected to the molds, in order that the surface may be freed from moisture.

In some cases the tube may be of a square, hexagonal, octangular, or other section, to accord with the object to be produced, for it should be understood that my invention is not restricted to the manufacture of flower-pots, but may be adopted in the production of many articles of earthenware and pottery.

I claim as my invention, and as an improvement in the manufacture of earthenware and pottery—

The within-described mode of first forming the clay into short tubes, and then subjecting the latter to the action of molds or dies under pressure, as set forth.

In testimony whereof I have signed my name to this specification in the presence of two subscribing witnesses.

WM. GALLOWAY.

Witnesses:
 WM. A. STEEL,
 HARRY SMITH.